June 11, 1957  J. R. V. MARTINY  2,795,038

PROCESS FOR PROTECTING MECHANICAL ASSEMBLIES

Filed May 26, 1953

INVENTOR.
Jean Raymond Valère Martiny.

BY
Maxwell E. Sparrow.
ATTORNEY.

United States Patent Office 2,795,038
Patented June 11, 1957

2,795,038
PROCESS FOR PROTECTING MECHANICAL ASSEMBLIES

Jean Raymond Valère Martiny, Rouen, France

Application May 26, 1953, Serial No. 357,415

Claims priority, application France May 28, 1952

5 Claims. (Cl. 29—460)

It is well known that mechanical assemblies, in particular hinged and/or sliding assemblies of machines or steering gear, deteriorate and perish, not so much because of the strains which they have to stand, but because of the erosion or corrosion resulting from the medium in which they are.

On the other hand, while there exist some devices, for instance joints or packings capable of efficiently protecting the said assemblies from erosion or corrosion, it often happens that one avoids using such devices because of the complications that occur in installing them.

The object of my invention, relating to the subject assemblies, is to protect these assemblies, through means easy to operate, against corrosion and erosion, and to maintain them in good operating condition.

My invention chiefly consists in coating the joint or assembly with a plastic lubricant and enclosing the said coating hermetically in an elastic sheath permitting the relative motions of the assembly.

My invention also consists in some other arrangements as mentioned hereafter and preferably used together with the main arrangement as indicated above.

My invention particularly covers certain methods of application and realization of the said arrangements and also of the assemblies of the subject kind protected in this manner, the components and tools appropriate to make them, and the units incorporating such assemblies.

By way of example, and for providing a better understanding of my invention, I will now disclose the manner of executing the same in a particular embodiment thereof as illustrated in a non-limiting sense in the accompanying drawing. In said drawing.

Figure 1:
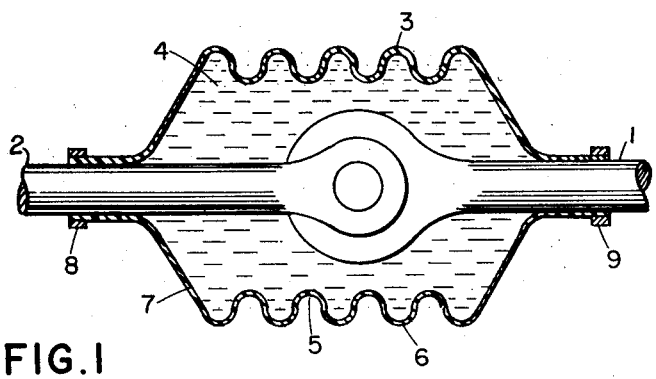
Figure 1 is a diagram of a section of a hinged fork-joint assembly protected according to my invention.

If it is intended to protect an assembly according to my invention, one proceeds as follows:

The assembly to be protected, comprising of a perforated rod 1 (see Figure 1) and a fork-joint rod 2 united through an axle 3, is coated with a plastic lubricant 4. The said lubricant may be a grease sufficiently cold and even, if need be, frozen, so that the surface of the lubricant may have a certain hardness and maintain the shape given to it. In order to facilitate coating, cooling or freezing may be effected only after the lubricant has been laid on the assembly. Preferably, the outside surface of the coating should have recesses such as 5 and projections like 6.

Over the external surface of coating 4, applied in this way, an elastic material is then deposited which will mold itself over the said surface forming a sheath 7. The ends of sheath 7 will be tightened on to rods 1 and 2 through collars 8 and 9 in order to constitute a hermetically closed casing for lubricant 4 and the assembly components. The elasticity of sheath 7 and the extensible form afforded by recesses and projections 5 and 6 will permit the free operation of the hinged connection of rods 1 and 2.

The material making up sheath 7 should preferably be applied by spraying.

The material constituting sheath 7 may be synthetic rubber. Sheath 7 may also be obtained through laying a coating of synthetic resin in a ketone solution. Optionally, and in order to facilitate such an operation, one may previously sprinkle the surface of coating 4 with talc or graphite.

It is desirable that the synthetic resin should be coated at a rather low temperature.

Experience has shown that, for such an application, ethyl-methyl-ketone is quite suitable as a solvent of synthetic resin.

Sheath 7 may be entirely made with the subject synthetic resin, but sheath 7 may also be constituted by covering one layer of synthetic resin, laid on coating lubricant 4, with one or more layers of possibly different substances which may be applied in the form of solutions in suitable solvents having a little or no action on synthetic resin.

Thus, sheath 7 may have a comparatively thin undercoating of synthetic resin, reinforced by a layer of natural rubber in a solution of gasoline, preferably sprayed on. Of course, the natural rubber may be replaced by synthetic rubber in a suitable solvent solution, such as methyl-isobutyl-ketone.

The substances indicated above as suitable for the sheath enclosing the lubricating coating have a good adherence to metals. In numerous instances of assemblies protected in this manner, this adhering property will make it possible to do away with tightening collars 8 and 9.

In order to carry out the work more quickly, it will be desirable to use a spray-gun with multiple apertures making it possible to spray in succession the plastic lubricant, the fluid for cooling the lubricant and the elastic material. It may be useful to provide the said gun with a temperature indicator in order to check the operations effected.

Figure 2:
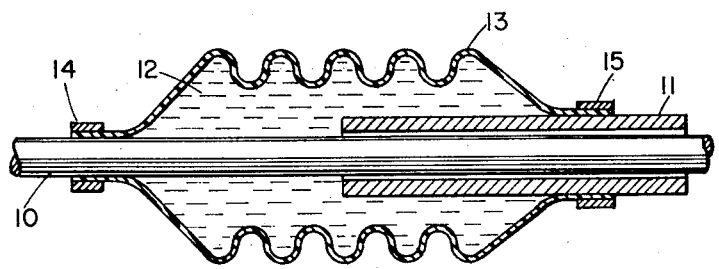
Figure 2 shows diagrammatically the section of a sliding assembly protected according to my invention.

The procedure is the same in the case of protection of a sliding assembly consisting of component 10 (see Figure 2) entering a guiding component 11. Plastic lubricant 12 will be covered by elastic sheath 13 fastened on to component 10 and part 11 through collars 14 and 15.

Again, one may proceed in the same manner in the case of more complicated assemblies such as sliding Cardan shafts which combine partial rotations with restricted translations.

The shape and the volume of the lubricant may be to suit the operation of the protected assembly. It will be easy to provide channels inside the latter to ensure the flow of the subject lubricant and in order to set up this flow circulation, one may take advantage of the relative motions of the assembly.

The thickness of the elastic sheath covering the assembly may be variable. Such a thickness namely may be increased in strain areas. The sheath also may be reinforced.

It results from the foregoing that by applying the processes as described, a protection of mechanical assemblies may be obtained, namely hinged and/or sliding assemblies, offering numerous advantages as against former processes, among others a practically indefinite protection, maintenance of lubrication, the elimination of periodical cleanings and greasings, easy and economical operation, the possibility of achieving such a protection by using rather varied materials giving every guaranty as regards elasticity and strength.

Of course, the invention is not restricted to the methods of application and realization specifically indicated, it also embodies all the variants.

What I claim is:

1. A process for protecting a joint of relatively movable parts which comprises the steps of enveloping said joint in a lubricant, temporarily increasing the rigidity of said lubricant by cooling, and hermetically enclosing said joint by applying an elastic sheath over the so-cooled lubricant.

2. A process according to claim 1, wherein said joint is enveloped by successively spraying said lubricant, a cooling fluid and a sheath-forming material around said joint.

3. A process according to claim 1, wherein said sheath is formed by the successive spraying of a plurality of layers.

4. A process according to claim 3, wherein said layers include at least one layer of synthetic resin.

5. A process according to claim 4, wherein said layers include at least one layer of natural rubber separated from said lubricant by said layer of synthetic resin.

References Cited in the file of this patent

UNITED STATES PATENTS

| | | |
|---|---|---|
| 2,441,227 | Pinles | May 11, 1948 |
| 2,442,640 | Dunn | June 1, 1948 |
| 2,473,618 | Stillwagon | June 21, 1949 |
| 2,608,529 | Varian | Aug. 26, 1952 |
| 2,629,992 | Anderson | Mar. 3, 1953 |